(12) United States Patent
Phadnis et al.

(10) Patent No.: US 7,986,703 B2
(45) Date of Patent: Jul. 26, 2011

(54) FORWARDING PACKETS IN A GATEWAY PERFORMING NETWORK ADDRESS TRANSLATION (NAT)

(75) Inventors: Amit S. Phadnis, Karnataka (IN); Praneet Bachheti, Fremont, CA (US); Anuradha Karuppiah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 12/510,052

(22) Filed: Jul. 27, 2009

(65) Prior Publication Data

US 2009/0290590 A1 Nov. 26, 2009

Related U.S. Application Data

(63) Continuation of application No. 09/910,936, filed on Jul. 24, 2001, now Pat. No. 7,586,940.

(51) Int. Cl.
*H04L 12/56* (2006.01)
(52) U.S. Cl. ........................................ 370/401; 370/466
(58) Field of Classification Search .................. 370/401, 370/466, 389, 392, 395.31, 395.32, 471
See application file for complete search history.

(56) References Cited

U.S. PATENT DOCUMENTS

| | | | |
|---|---|---|---|
| 5,390,260 A | 2/1995 | Bezek | |
| 6,331,984 B1 | 12/2001 | Luciani | |
| 6,457,061 B1 * | 9/2002 | Bal et al. | ....................... 709/245 |
| 6,496,439 B1 | 12/2002 | McClure | |
| 6,563,824 B1 | 5/2003 | Bhatia et al. | |
| 6,608,830 B1 | 8/2003 | Hirano et al. | |
| 6,650,641 B1 | 11/2003 | Albert et al. | |
| 6,678,269 B1 | 1/2004 | Michels et al. | |
| 6,691,169 B1 | 2/2004 | D'Souza | |
| 6,704,295 B1 | 3/2004 | Tari et al. | |
| 6,704,317 B1 | 3/2004 | Dobson | |
| 6,775,281 B1 | 8/2004 | Brown | |
| 6,888,837 B1 * | 5/2005 | Cunningham et al. | ......... 370/401 |
| 6,892,245 B1 | 5/2005 | Crump et al. | |
| 6,912,223 B1 * | 6/2005 | Sloane | .......................... 370/401 |
| 6,931,437 B2 | 8/2005 | Hariu | |
| 6,934,763 B2 | 8/2005 | Kubota et al. | |
| 7,107,360 B1 | 9/2006 | Phadnis et al. | |
| 7,586,940 B1 | 9/2009 | Phadnis et al. | |
| 2002/0023152 A1 | 2/2002 | Oguchi | |

(Continued)

OTHER PUBLICATIONS

P. Srisuresh & M. Holdrege, "Request for Comments: 2663—IP Network Address Translator (NAT) Terminology and Considerations," www.ietf.org, Aug. 1999, 29 pages.

(Continued)

*Primary Examiner* — Brian D Nguyen
(74) *Attorney, Agent, or Firm* — Patent Capital Group (57) ABSTRACT

A gateway device providing a search utility to determine both NAT information and forwarding information ("both pieces of information") in a single search operation. The single search operation may be implemented using a single table storing both pieces of information necessary for processing a packet. As a result, both pieces of information can be potentially retrieved in a single memory access. Due to the single (or few) memory access, the throughput performance of a gateway may be enhanced. In an embodiment, the gateway is implemented as a service selection gateway which provides connectivity between multiple remote systems and service domains. The NAT/forwarding information is partitioned according to service domains such that the information needed to process packets from/to the same service domain is contained in the same table.

17 Claims, 4 Drawing Sheets

U.S. PATENT DOCUMENTS

| | | |
|---|---|---|
| 2002/0114319 A1 | 8/2002 | Liu et al. |
| 2002/0116502 A1 | 8/2002 | Iyer et al. |
| 2002/0141384 A1 | 10/2002 | Liu et al. |
| 2003/0007486 A1* | 1/2003 | March et al. .................. 370/389 |
| 2003/0009561 A1* | 1/2003 | Sollee .......................... 709/227 |
| 2003/0018814 A1* | 1/2003 | Kao et al. ..................... 709/245 |

* cited by examiner

FORWARDING PACKETS IN A GATEWAY PERFORMING NETWORK ADDRESS TRANSLATION (NAT)

RELATED APPLICATIONS

The present application is related to the co-pending US patent application entitled, "NETWORK ADDRESS TRANSLATION IN A GATEWAY,", Ser. No. 09/910,937, Filing Date: Jul. 24, 2001, and is a continuation (and claims the benefit of priority under 35 U.S.C. §120) of U.S. application Ser. No. 09/910,936, filed Jul. 24, 2001 now U.S. Pat. No. 7,586,940, entitled "FORWARDING PACKETS IN A GATEWAY PERFORMING NETWORK ADDRESS TRANSLATION (NAT)." The disclosure of the prior applications are considered part of (and are incorporated by reference in) the disclosure of this application.

BACKGROUND OF THE INVENTION

1. Field of the Invention

The present invention relates to gateways used in Internetworking Technologies, and more specifically to a method and apparatus for forwarding packets in a gateway performing network address translation (NAT).

2. Related Art

Gateways are often used to enable users at remote locations (e.g., at homes) to access different target systems (e.g., a computer system on a local area network). A gateway provides the connectivity between remote systems (e.g., personal computers) at remote locations with the target systems of interest to enable different network applications.

One of the common tasks performed by a gateway is forwarding (or routing) of packets. In a typical situation, the gateway receives a packet on one port (e.g., from a remote system) and forwards the packet on another port (e.g., to a target system). Forwarding usually entails a route lookup operation in which a forwarding table is examined to determine the specific port on which to forward a received packet. The forwarding task generally provides the basic building block to inter-connect a large number of systems using potentially many gateways.

Another task performed by some of the gateways is network address translation (NAT). NAT generally refers to substitution of an address ("original address") in a received packet with a new address. The substitution generally enables a system (either remote system of target system) to be addressed consistent with the local addressing approach at both ends of a communication path.

For example, a remote system may be addressed by a local address at a remote location and by an external address by a target system. A gateway performs the necessary substitutions (i.e., from local address to external address when packets are transmitted from the remote system to target system, and from external address to local address when transmitted in the other direction) to allow communication between the two systems using different addresses.

Such substitutions also require a lookup operation, in which a NAT table is examined to map the original address to the new address. For further details of many types of NAT implementations, the reader is referred to request for comment (RFC) 1661, available from www.ietf.org, and is incorporated in its entirety herewith.

A prior gateway may employ separate searches associated with the forwarding and NAT tasks. Multiple searches generally consume more time. The additional time requirement may impede the throughput performance of a gateway, and may thus be undesirable. What is therefore needed is a method and apparatus which enables a gateway to forward packets quickly while supporting NAT.

SUMMARY OF THE INVENTION

A gateway device in accordance with the present invention determines both the NAT information and forwarding information necessary to process a packet using a single search. The NAT information is used to replace a original address in a packet with a new address specified by the NAT information, and the forwarding information (either directly or indirectly) specifies a port interface on which the packet is to be forwarded. By implementing a single search operation to determine both NAT and forwarding information, the number of memory accesses may be reduced, thereby potentially enhancing the throughput performance of the gateway device.

In one embodiment, the gateway device comprises a service selection gateway connecting multiple remote systems to multiple service domains. The service domains may provide external addresses which are bound (mapped) to/from respective local addresses of remote systems. The NAT information specifies the respective bindings. A multi-way content addressable (CAM) indexed by source and destination addresses may be used to store the NAT and forwarding related information.

In such an embodiment, the entire NAT and forwarding information may be partitioned according to service domains such that the information from/to each service domain is available in a single table. Each table may be stored in a separate CAM. By partitioning the information, the size of each table may be kept small/manageable, thereby keeping the access times (of information) low.

According to another aspect of the present invention, information related to multiple service domains may be stored in a single table if the accessible address space of the two domains do not overlap (i.e., no common destination addresses in the upstream direction). As a result, the number of tables (CAMs) required may be minimized.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention is described with reference to the accompanying drawings, wherein.

DETAILED DESCRIPTION OF THE PREFERRED EMBODIMENTS

1. Overview and Discussion of the Invention

A gateway device implemented in accordance in with the present invention determines forwarding information (i.e., port to be forwarded on) and NAT mapping information (new address corresponding to a original address) using a single search operation. In one embodiment described below, a single memory (e.g., content accessible memory) stores both pieces of information necessary to process a packet in the form of single table, and only a single memory access is required to determine both pieces of information. Due to such retrieval in a single search and/or memory access, the performance throughput of a gateway may be improved.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in several other environments.

2. Example Environment

Figure 1:
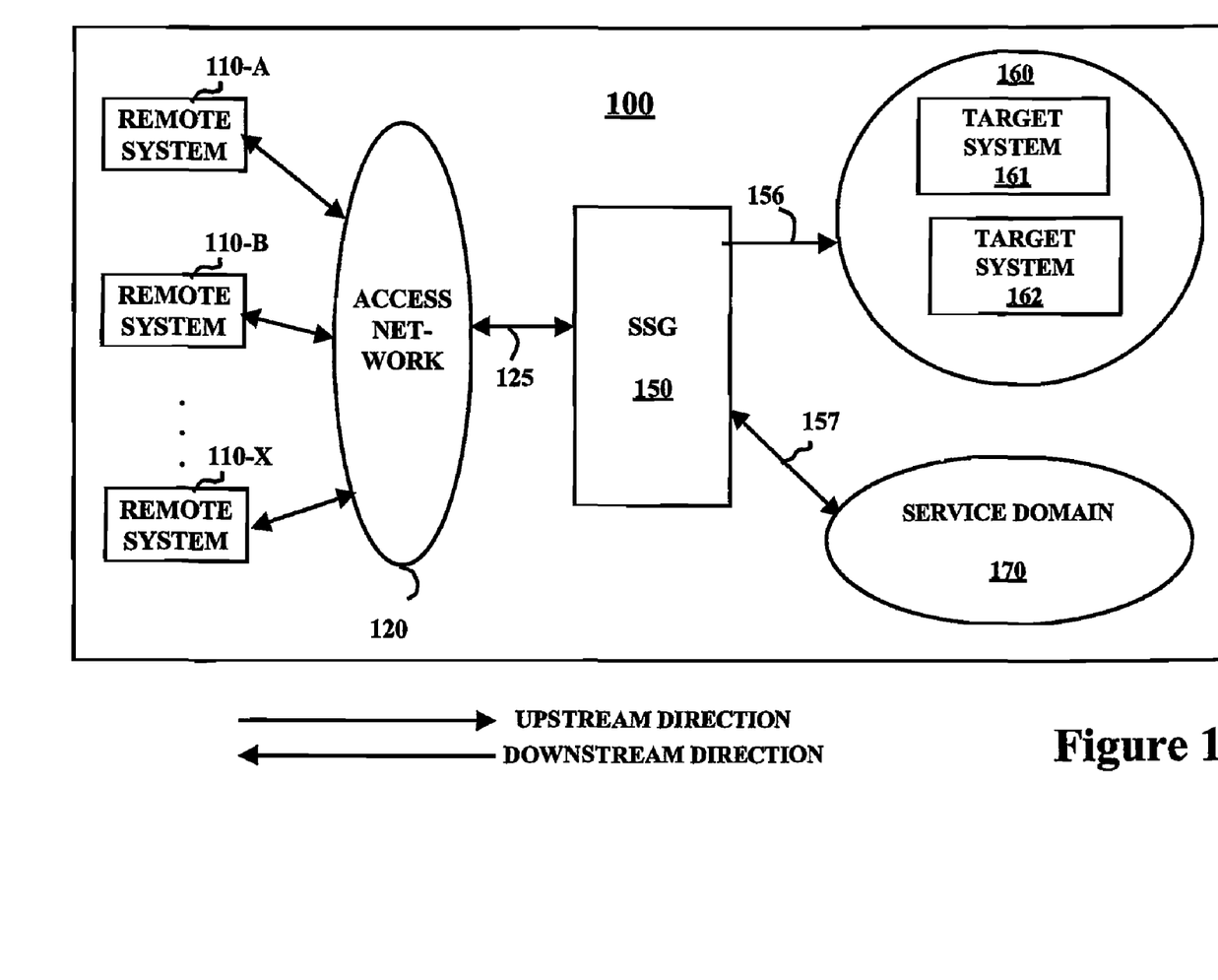
FIG. 1 is a block diagram illustrating an example communication environment in which the present invention can be implemented.

FIG. 1 is a block diagram of an example communication environment 100 in which the present invention can be implemented. Communication environment 100 may contain remote systems 110-A through 110-X, access network 120, SSG (service selection gateway) 150, and service domains 160 and 170. An embodiment of communication environment 100 is implemented using Internet Protocol (IP), and further description is continued substantially with reference to IP. However, various aspects of the present invention can be implemented using other protocols also.

Each of the remote systems 110-A through 110-X is addressed by a local address, unique at least when SSG 150 assigns the local addresses during the set up of the corresponding PPP (point-to-point protocol) sessions. Only the details of PPP as relevant to an understanding of the example environment are described herein. For further details about PPP, the reader is referred to request for comment (RFC) 1661, available from www.ietf.org, and is incorporated in its entirety herewith. Computer systems (or any data processing systems) are examples of the remote systems.

Remote systems 110-A through 110-X may be used to access the services provided using target systems (e.g., 161 and 162 within service domain 160) in various service domains 160 and 170 as described below in further detail. Access network 120 provides the electrical and physical interface consistent with the technology (e.g., remote access, Digital Subscriber Line) used by the corresponding remote system. Access network 120 may be implemented in a known way.

Service domain 160 may correspond to a corporate network, which can be accessed by users at remote systems 110-A through 110-X using VPN service. Service domain 170 may correspond to an Internet Service Provider (ISP). Each service domain typically contains many target systems, even though only two target systems are shown in service domain 160 for illustration.

An embodiment of SSG 150 enables each remote system to set up a PPP session and access different services. SSG 150 performs a NAT operation and a forwarding operation quickly. The NAT operation is used in enabling such access. Accordingly, an example NAT operation is described for illustration.

3. Illustrative Example

For illustration, it is assumed that a user wishes to access service domain 160 using remote system 110-A (having a local IP address of addr-A). Using a known approach, service domain 160 may assign an IP address of addr-T to remote system 110 for accessing service domain 160. Addr-T represents a unique address at least in service domain 160. Similarly, using another known approach (e.g., during PPP session setup or even manually by a network administrator), remote system 110 is assigned a local address of addr-A.

SSG 150 maintains NAT information indicating that the source address addr-A needs to be translated into addr-T in the upstream direction (i.e., from remote systems to service domains), and the destination address addr-T is to be translated to addr-A in the downstream direction (from service domains to remote systems). The translated addresses (new addresses) replace the original address (source address in upstream direction and destination addresses in the downstream direction) in a packet, and the packet with the translated address is transmitted by SSG 150.

The specific port ("transmit port") on which to transmit is determined by the routing (or forwarding) information. Thus, in the upstream direction, the destination address (the address of the target system) may determine the transmit port. The address (local or external) of the remote system may determine the transmit port in the downstream direction. Data in the other fields may also be used, typically depending on the NAT approach employed.

The manner in which SSG 150 processes packets while performing NAT and forwarding operations is described below. The approach is described first with reference to a method and then with reference to an example implementation.

4. Method

Figure 2:
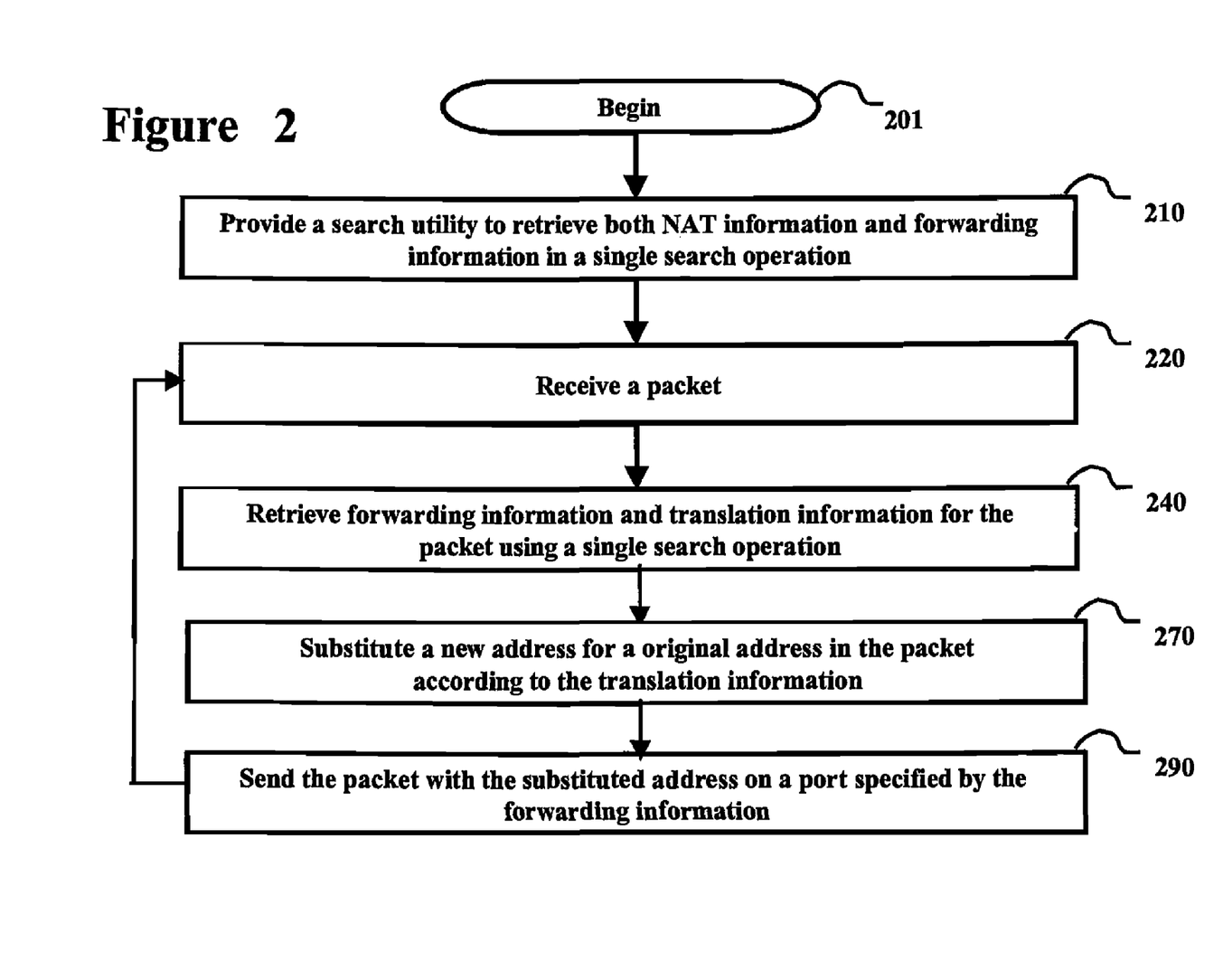
FIG. 2 is a flow chart illustrating a method in accordance with the present invention.

FIG. 2 is a flow chart depicting a method in accordance with the present invention. The method is described with reference to FIG. 1 for illustration. However, the method may be performed in other environments as well. The method starts in step 201, in which control immediately passes to step 210.

In step 210, a search utility to retrieve both NAT information and forwarding information in a single search is provided. The search utility can be implemented in one of several ways. In general, a search key is provided as an input to the search utility and the two pieces of information (NAT and forwarding related) are determined/retrieved/received.

The search operation itself may involve one or more memory accesses depending on the implementation of the search operation. In one embodiment described below, a content addressable memory (CAM) is used to store both forwarding information and the NAT information in the form of a single table. By providing the appropriate inputs to the CAM, both pieces of information can be retrieved in a single access.

In step 220, a packet is received. In step 240, the NAT information and forwarding information (for the packet received in step 220) is retrieved in a single search. The data may be retrieved by providing a combination of information (including, among others, one or more of source address, destination address, port number) depending on the specific implementation of SSG 150. The NAT information provides a new address for an original address present in the packet. The forwarding information generally indicates the (port/interface) direction in which the packet is to be forwarded.

In step 270, the new address determined in step 240 is substituted for an original address present in the packet. Fields in the packet may be re-computed as necessitated by the substitution. In step 290, the packet is forwarded according to the forwarding information determined in step 240. Thus, using the method of FIG. 2 to a gateway device may process packets. The description is continued with an embodiment of SSG 150.

5. Service Selection Gateway

Figure 3:
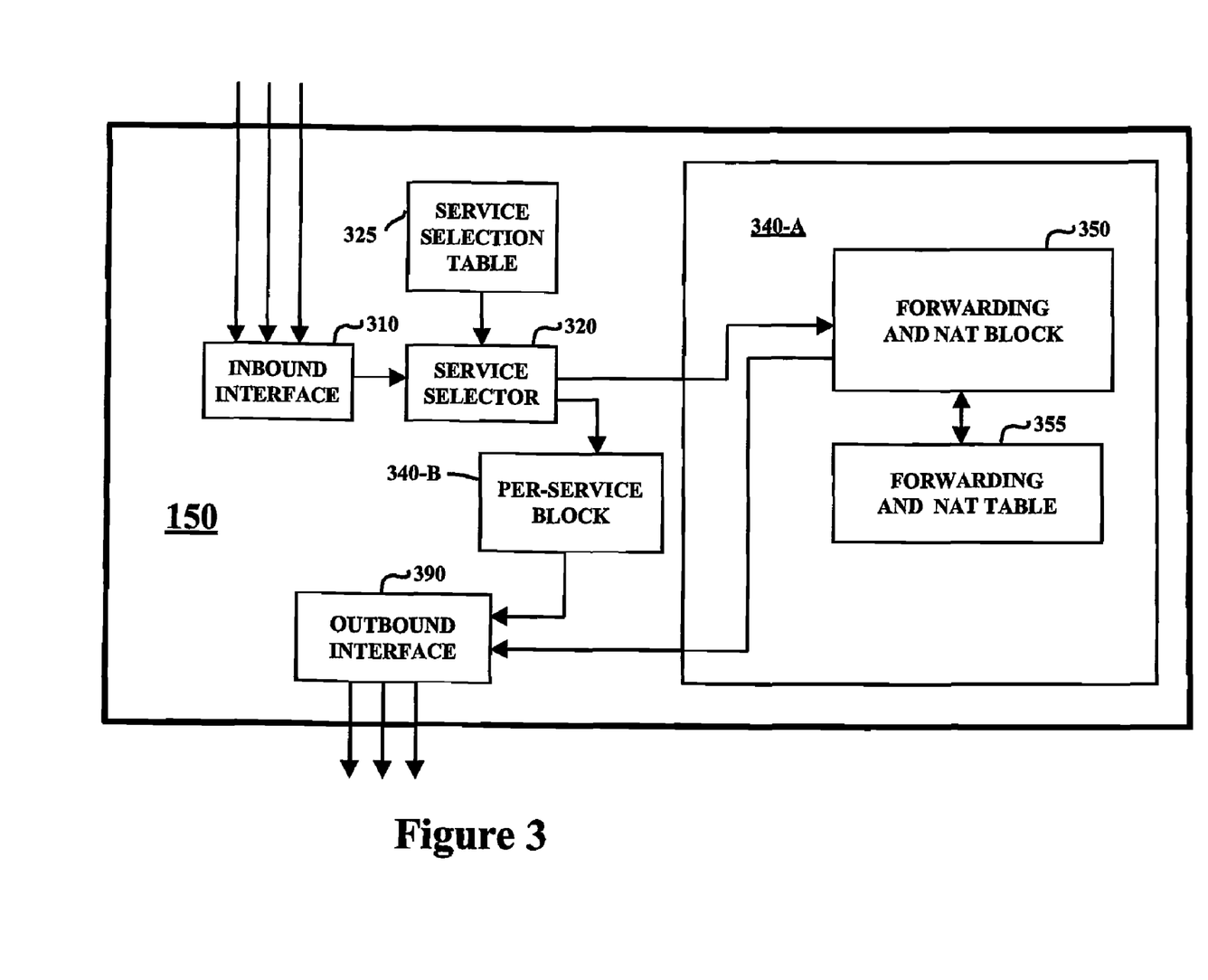
FIG. 3 is a block diagram illustrating the internals of a service selection gateway (SSG) in an embodiment of the present invention.

FIG. 3 is a block diagram illustrating the details of an embodiment of SSG 150 in accordance with the present invention. SSG 150 is shown containing inbound interface 310, service selector 320, per-service blocks 340-A and 340-B, and outbound interface 390. Each component is described below in further detail.

Per-service block 340-A is shown containing forwarding and NAT block 350 and forwarding and NAT table 355. Per-service block 340-B may also contain similar components, but are not shown (and described) for conciseness. Accordingly, the description of per-service blocks is continued with reference to only per-service block 340-A.

In one embodiment, the forwarding and NAT blocks in the per-service blocks 340-A and 340-B are implemented substantially in software (i.e., in the form of instructions organized as routines). In such a case, the forwarding and NAT block may be shared by different per-service blocks 340-A and 340-B. Alternatively, each of the blocks may be implemented in the form of integrated circuits, usually to attain higher throughput performance in the service selection gateways.

In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing SSG 150 with a desired mix of hardware, software and/or firmware. The description is continued with reference to each noted component of FIG. 3 above.

Inbound interface 310 is shown receiving packets from three paths (125, 156 and 157 of FIG. 1). Inbound interface 310 assembles each packet and forwards the packets to service selector block 320. Inbound interface 310 provides the electrical and other protocol interfaces necessary to receive packets from various paths, and may be implemented in a known way. Outbound interface 390 is also described similarly, except that the packets received from per-service blocks 340-A (reformatter 380) and 340-B are transmitted in the outbound direction on the same three ports.

Each received packet contains a source address and a destination address. By using NAT approach in accordance with various aspect of the present invention, one of the two addresses (original address) is replaced with a new address as described below in further detail. In addition, the manner in which the packet is to be forwarded is described below.

Service selector 320 determines the specific NAT table to use for each packet by accessing service selection table 325. In an embodiment operating in the context of PPP protocol, a local address is assigned to each remote system when a user establishes a PPP session. Service selection table 325 is configured with (or otherwise has access to information indicating) the specific service domains the user is entitled to access.

Thus, when a packet is received, the source IP address is examined to determine the specific services the user is entitled to access. The destination address in the packet is then used to determine the specific one of the services to which the packet is to be forwarded to (assuming a constraint that a user system can access only domains with non-overlapping IP destination/external addresses at the same time).

Service selector 320 then selects one of the per-service blocks 340-A or 340-B (or more specifically the corresponding NAT table) depending on the determined service domain. Assuming the determined service domain is service domain 160 and per-service block 340-A is designed to process the packets related to service domain 340-A, service selector 320 passes a received packet to per-service block 340-A.

Forwarding and NAT block 350 accesses forwarding and NAT table 355 to determine the forwarding information and NAT information in a single access. Both types of information may be determined in a single access as a single table is used to store the both pieces of information. The implementation of forwarding and NAT table 355 generally depends on the routing and/or NAT approaches employed. An example implementation of forwarding and NAT table 355 is described below.

5. Forwarding and NAT Table

In an embodiment, forwarding and NAT table 355 is implemented using a multi-way content addressable memory (CAM) widely available in the market place. As is well known, a CAM refers to a memory which is addressable by its content (as opposed to a random access memory in which each location is accessed by specifying the address of that location). In addition, a multi-way CAM enables content to be searched using multiple components of keys. Thus, the source IP address, destination IP address, forwarding information, NAT information, and other information (depending on the implementation) may be stored in a CAM, and when a packet is received, the appropriate contents of the packet are provided as key(s), and the NAT information and forwarding information is retrieved.

As may be appreciated, each forwarding and NAT block of FIG. 3 stores the data related to a single service domain or multiple service domains when the accessible address space of the service domains do not overlap. Thus, with respect to FIG. 1, SSG 150 may contain two forwarding and NAT tables, with one table storing the forwarding and NAT information related to all destination addresses accessible (by the remote systems) in service domain 160, and another table storing the forwarding and NAT information related to all destination addresses accessible in service domain 170. Each of the tables contains the corresponding forwarding information (to and from the corresponding service domain) as well. When the accessible address spaces of the two service domains do not overlap, the two tables may be combined into a single table.

Thus, each remote system accessing different service domains will have an entry in each of the forwarding and NAT tables corresponding to the accessed domains. The two tables can be combined into a single table if the addresses spaces (accessible to remote systems) of the two domains do not overlap.

Continuing with reference to SSG 150 of FIG. 3, the multi-way CAM is designed to be provided source and destination IP addresses as to components of a search key, and the CAM returns the NAT information (i.e., translation of the local address to external address in the upstream direction and external address to the local address in the downstream direction) and the forwarding information (either directly or indirectly the specific interface/physical port on which the packet is to be forwarded). The packet is processed using the returned information.

It should be appreciated that the contents and access of the CAM may need to be designed differently depending on the NAT and forwarding approaches used. For example, in some implementations of NAT (described in RFC 2663 entitled, "IP Network Address Translator (NAT) Terminology and Considerations", incorporated herein by reference in its entirety), it may be desirable to include the port number also as a part of the input and a new port number also may be returned as the CAM output.

Once the NAT information and the forwarding information is received, NAT lookup block 350 replaces the old address with the determined new address, and forwards the packet according to the forwarding information retrieved from forwarding and NAT table 355. The throughput performance of SSG 150 may be enhanced due to the availability of NAT and forwarding information in a single memory access.

Each component of SSG 150 described above may be implemented substantially in hardware. However, any of the components may be implemented in a combination of one or more of hardware, software and firmware. An embodiment implemented substantially in software is described below.

6. Software Implementation

Figure 4:
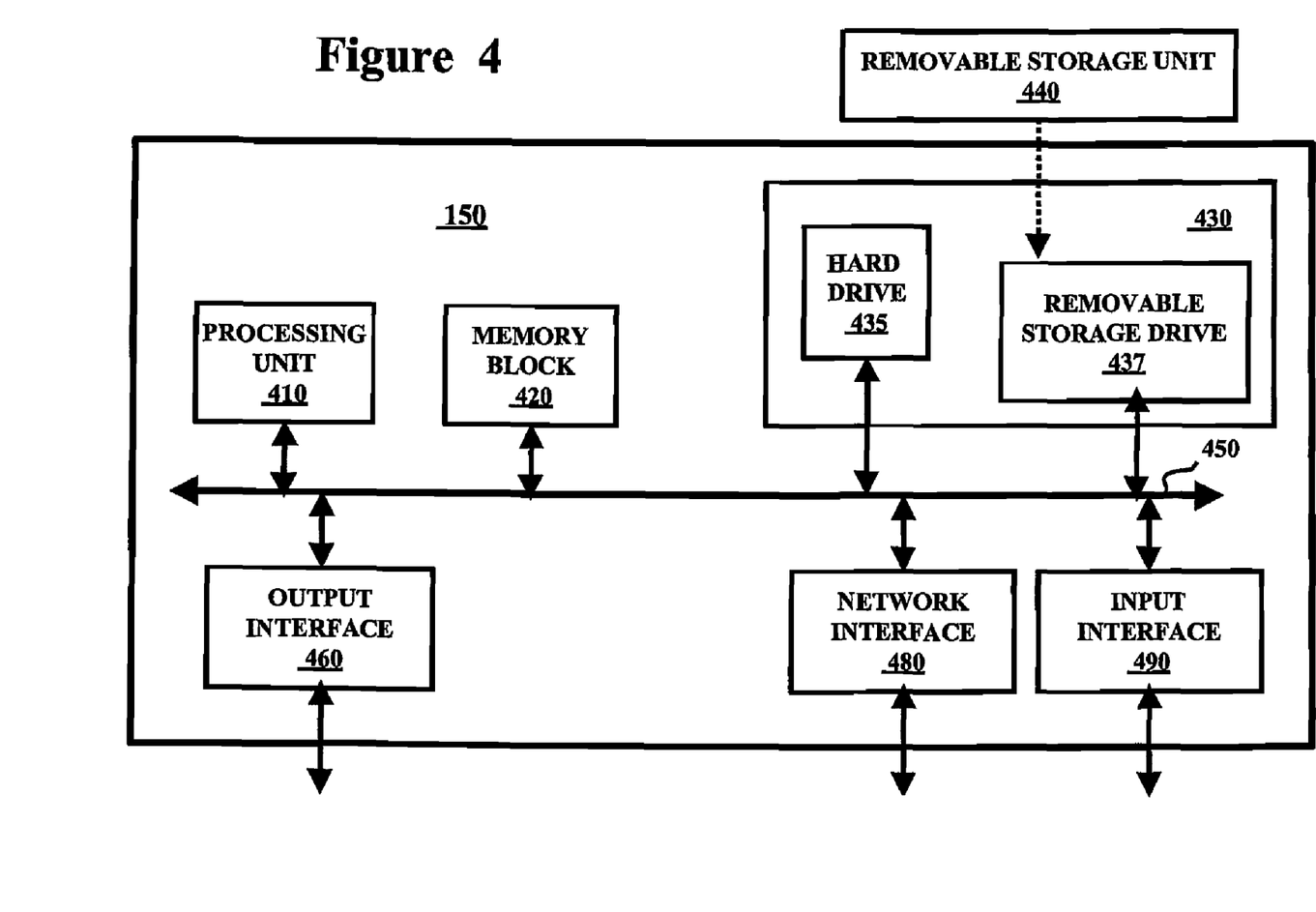
FIG. 4 is a block diagram illustrating the implementation of a substantially in software according to an aspect of the present invention.

FIG. 4 is a block diagram illustrating the details of a gateway (e.g., SSG 150) in one embodiment. SSG 150 is shown containing processing unit 410, memory block 420, storage 430, output interface 460, network interface 480 and input interface 490. Each component is described in further detail below.

Output interface 460 provides output signals (e.g., display signals to a display unit, not shown) which can form the basis for a suitable user interface for a user to interact with SSG 150. Input interface 490 (e.g., interface with a key-board and/or mouse, not shown) enables a user to provide any necessary inputs to SSG 150. Output interface 460 and input interface 490 can be used, for example, to enable configuration of SSG 150 to provide various features of the present invention.

Network interface 480 enables SSG 150 to send and receive data on communication networks using protocols such as Internet Protocol (IP). Network interface 480 may correspond to inbound interface 310 and outbound interface 390 of FIG. 3. Network interface 480, output interface 460 and input interface 490 can be implemented in a known way.

Memory block 420 and/or storage 430 may be referred to as a memory. Memory block 420 may receive instructions and data on path 450 from storage 430. Even though shown as one unit, memory block 420 may be implemented as several units. One of the units may correspond to a CAM storing the forwarding and NAT tables managed in accordance with the present invention. As noted above, such storage enables the NAT and forwarding information in a single memory access. Secondary memory 430 may contain units such as hard drive 435 and removable storage drive 437. Secondary storage 430 may store the software instructions and data, which enable SSG 150 to provide several features in accordance with the present invention.

Some or all of the data and instructions (software routines) may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from memory block 420. Some can be special purpose processors adapted for specific tasks (e.g., for memory/queue management). The special purpose processors may also be provided instructions from memory block 420.

In general, processing unit 410 reads sequences of instructions from various types of memory medium (including memory block 420, storage 430 and removable storage unit 440), and executes the instructions to provide various features of the present invention. Such features include implementing a single search to determine NAT and forwarding information and/or using the same table for both NAT information and the forwarding information. Thus, SSG 150 may be implemented substantially in software to process various packets received from remote systems and service domains.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method, comprising:
   receiving a packet;
   determining forwarding information and network address translation (NAT) information for the packet;
   substituting a new address for an original address in the packet based on the NAT information;
   forwarding the packet with the new address on a communication path provided in the forwarding information, wherein the forwarding information and the NAT information are provided together in memory such that a single access to the memory can retrieve both the forwarding information and the NAT information; and
   accessing a service selection table to determine which NAT table of a plurality of NAT tables to use for additional packets received, wherein the service selection table includes information indicating specific access parameters associated with specific service domains.

2. The method of claim 1, further comprising:
   searching the memory in a single search operation in order to retrieve the forwarding information and the NAT information for processing the packet.

3. The method of claim 1, wherein the memory includes a table for storing the forwarding information and the NAT information, and wherein the table is partitioned by service domains.

4. The method of claim 1, wherein a table is stored in a content addressable memory (CAM) indexed by a source address or a destination address that are provided as a key to be input to the CAM.

5. The method of claim 1, further comprising:
   providing a search key as input for retrieving both the NAT and forwarding information, wherein the key includes a port identification, and a selected one of a source address and a destination address associated with the packet.

6. The method of claim 1, wherein additional NAT information and additional forwarding information are stored in a plurality of tables partitioned according to service domains such that the additional forwarding information and the additional NAT information related to the same service domain are stored in a selected one of the tables.

7. The method of claim 1, further comprising:
examining the packet to identify a source Internet Protocol (IP) address to be used in determining which services an end user can access; and
forwarding the packet to a service domain based on access permission granted via the IP address.

8. A gateway, comprising:
an inbound interface configured to receive a packet;
a network address translation (NAT) and forwarding table, wherein forwarding information and NAT information are determined for the packet, and wherein a new address is substituted for an original address in the packet based on the NAT information;
an outbound interface configured to forward the packet with the new address on a communication path provided in the forwarding information, wherein the forwarding information and the NAT information are provided together in the table such that a single access to the table can retrieve both the forwarding information and the NAT information; and
a service selector configured to examine the packet to identify a source Internet Protocol (IP) address to be used in determining which services an end user can access, wherein the packet is forwarded to a service domain based on access permission granted via the IP address.

9. The gateway of claim 8, wherein the table is searched in a single search operation in order to retrieve the forwarding information and the NAT information for processing the packet.

10. The gateway of claim 8, wherein the table is stored in a content addressable memory (CAM) indexed by a source address or a destination address that are provided as a key to be input to the CAM.

11. The gateway of claim 8, wherein a search key is provided as input for retrieving both the NAT and forwarding information, wherein the key includes a port identification, and a selected one of a source address and a destination address associated with the packet.

12. The gateway of claim 8, wherein table includes information indicating specific access parameters associated with specific service domains.

13. The gateway of claim 8, wherein additional NAT information and additional forwarding information are stored in a plurality of tables partitioned according to service domains such that the additional forwarding information and the additional NAT information related to the same service domain are stored in a selected one of the tables.

14. Logic encoded in one or more tangible media that includes code for execution and when executed by a processor operable to perform operations comprising:
receiving a packet;
determining forwarding information and network address translation (NAT) information for the packet;
substituting a new address for an original address in the packet based on the NAT information;
forwarding the packet with the new address on a communication path provided in the forwarding information, wherein the forwarding information and the NAT information are provided together in memory such that a single access to the memory can retrieve both the forwarding information and the NAT information;
examining the packet to identify a source Internet Protocol (IP) address to be used in determining which services an end user can access; and
forwarding the packet to a service domain based on access permission granted via the IP address.

15. The logic of claim 14, the operations further comprising:
searching the memory in a single search operation in order to retrieve the forwarding information and the NAT information for processing the packet.

16. The logic of claim 14, wherein a table is stored in a content addressable memory (CAM) indexed by a source address or a destination address that are provided as a key to be input to the CAM.

17. The logic of claim 14, the operations further comprising:
providing a search key as input for retrieving both the NAT and forwarding information, wherein the key includes a port identification, and a selected one of a source address and a destination address associated with the packet.

* * * * *